(12) United States Patent
Severn et al.

(10) Patent No.: US 8,394,733 B2
(45) Date of Patent: Mar. 12, 2013

(54) PROCESS FOR THE PREPARATION OF AN UNSUPPORTED, SOLID OLEFIN POLYMERISATION CATALYST AND USE IN POLYMERISATION OF OLEFINS

(75) Inventors: John Severn, Eindhoven (NL); Pertti Elo, Helsinki (FI); Sameer Vijay, Helsinki (FI); Marja Mustonen, Koskenkylän saha (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 12/998,628

(22) PCT Filed: Nov. 4, 2009

(86) PCT No.: PCT/EP2009/064606
§ 371 (c)(1),
(2), (4) Date: May 10, 2011

(87) PCT Pub. No.: WO2010/052237
PCT Pub. Date: May 14, 2010

(65) Prior Publication Data
US 2011/0218310 A1 Sep. 8, 2011

(30) Foreign Application Priority Data
Nov. 10, 2008 (EP) .................................... 08168706

(51) Int. Cl.
*B01J 31/22* (2006.01)
*C08F 4/642* (2006.01)
*C08F 4/6592* (2006.01)

(52) U.S. Cl. ........ 502/104; 502/107; 502/152; 526/160; 526/165; 526/943

(58) Field of Classification Search .................. 526/160, 526/165, 943; 502/103, 152, 104, 107
See application file for complete search history.

(56) References Cited

U.S. PATENT DOCUMENTS

| | | | |
|---|---|---|---|
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |
| 5,922,631 A | 7/1999 | Sangokoya |

FOREIGN PATENT DOCUMENTS

| | | |
|---|---|---|
| EP | 0035893 A2 | 9/1981 |
| EP | 0129368 A1 | 12/1984 |
| EP | 0260130 A1 | 3/1988 |
| EP | 0279586 A2 | 8/1988 |
| EP | 0302424 A1 | 2/1989 |
| EP | 0314797 A1 | 5/1989 |
| EP | 0423101 A1 | 4/1991 |
| EP | 0537130 A1 | 4/1993 |
| EP | 0561476 A1 | 9/1993 |
| EP | 0594218 A1 | 4/1994 |
| EP | 1323747 A1 | 7/2003 |
| WO | 9410180 A1 | 5/1994 |
| WO | 9613529 A1 | 5/1996 |
| WO | 9710248 A1 | 3/1997 |
| WO | 9718218 A1 | 5/1997 |
| WO | 9728170 A1 | 8/1997 |
| WO | 9846616 A1 | 10/1998 |
| WO | 9849208 A1 | 11/1998 |

(Continued)

OTHER PUBLICATIONS

Severn et al. Chem. Rev., 2005, pp. 4073-4147, vol. 105, No. 11.
Severn, John R. & Chadwick, John C., Handbook Tailor-Made Polymers: Via Immobilization of Alpha-Olefin Polymerization Catalysts, 2008.
V.C. Gibson et al. Angew. Chem. Int. Ed., Engl., 1999, pp. 428-447, vol. 38.
V.C. Gibson, Advances in Non-Metallocene Olefin Polymerization Catalysis, Chem Rev. 2003, 103, pp. 283-315.
International Search Report and Written Opinion for Application No. PCT/EP2009/064606 Filed on Feb. 2, 2010.

*Primary Examiner* — Caixia Lu
(74) *Attorney, Agent, or Firm* — Warn Partners, P.C.

(57) ABSTRACT

Improved process for the preparation of an unsupported, heterogeneous olefin polymerization catalyst, comprising an organometallic compound of a transition metal of Group 3 to 10 of the Periodic Table (IUPAC) or of an actinide or lanthanide in the form of solid particles comprising the steps of a) preparing a solution of an aluminoxane and an ionic complex M-X, M being an alkali or earth alkali metal and X being a halide or pseudo halide, in a molar ratio of Al of the aluminoxane to M of the ionic complex between 80:1 and 300:1, b) mixing said solution with an organometallic compound of a transition metal of Group 3 to 10 of the Periodic Table (IUPAC) or of an actinide or lanthanide in a molar ratio of M of the ionic complex to the transition metal of the organometallic compound between 1:1 and 4:1, yielding a second solution, c) dispersing said second solution obtained in step b) in a solvent immiscible therewith to form an emulsion in which said second solution of step b) forms the dispersed phase in the form of droplets and the solvent immiscible with said solution forms the continuous phase, d) solidifying said dispersed phase to convert said droplets to solid particles and optionally recovering aid particles to obtain said catalyst, the catalysts itself and its use for olefin polymerization.

12 Claims, 1 Drawing Sheet

FOREIGN PATENT DOCUMENTS

| | | |
|---|---|---|
| WO | 9856831 A1 | 12/1998 |
| WO | 9910353 A1 | 3/1999 |
| WO | 9912981 A1 | 3/1999 |
| WO | 9919335 A1 | 4/1999 |
| WO | 9941290 A1 | 8/1999 |
| WO | 0034341 A1 | 6/2000 |
| WO | 0170395 A1 | 9/2001 |
| WO | 02060963 A1 | 8/2002 |
| WO | 03051934 A2 | 6/2003 |
| WO | 03082879 A1 | 10/2003 |
| WO | 2006069733 A1 | 7/2006 |

PROCESS FOR THE PREPARATION OF AN UNSUPPORTED, SOLID OLEFIN POLYMERISATION CATALYST AND USE IN POLYMERISATION OF OLEFINS

This application is a National Stage of International Application No. PCT/EP2009/064606, filed Nov. 4, 2009. This application claims priority to European Patent Application No. 08168706.3, filed on Nov. 10, 2008. The disclosures of the above applications are incorporated herein by reference.

This invention relates to a process for the preparation of an unsupported, solid metallocene olefin polymerisation catalyst, to the use of the catalyst in olefin polymerisation and to the catalyst per se.

In particular, the invention describes the use of an aluminoxane co-catalyst and a compound, which can dissociate or partially dissociate into cationic and anionic species (M-X species), to form a solution which is then subsequently reacted with a metallocene complex to form the catalyst species by emulsion/solidification technology.

Many catalysts and processes are known for the preparation of olefin polymers. Ziegler-Natta (ZN) catalyst compositions and chromium oxide compounds have, for example, been found to be useful in the preparation of polyolefins.

Further the use of single-site (e.g. metallocene) catalysts in olefin polymerisation has been known for many years and has been found to afford polymer properties not easily available by using ZN catalysts.

Metallocene compounds/procatalysts are conventionally activated using a cocatalyst such as an alumoxane known from the literature to form the active metallocene catalyst species.

The first single-site catalysts to be developed were homogeneous, i.e. they were used in solution in the polymerisation reaction. Due to the many drawbacks of homogeneous solution systems, several different approaches have been used to try to overcome the problems of the solution catalyst systems. Nowadays the most commonly used catalyst systems comprise heterogeneous catalysts, wherein catalyst components are supported on an external carrier. Such catalyst systems are described for example by Severn et al., Chem. Rev. 2005; 105(11); 4073-4147 or in the Handbook Tailor-Made Polymers: Via Immobilization of Alpha-Olefin Polymerization Catalysts of Severn et al.

The carriers used have a porous structure in order to facilitate catalyst impregnation into the support. Carrier materials are typically polymeric or inorganic supports, most typically silica, alumina or magnesium dichloride based materials.

However, even the catalysts supported on external carriers have their drawbacks. The main drawbacks concern the inhomogeneity of the resulting catalyst. From the point of view of catalyst and polymer properties, one of the most important drawbacks of this kind of heterogeneous catalyst system is that it is difficult or even impossible to get solid catalyst particles, wherein the catalyst components are evenly distributed thorough the catalyst support. Furthermore, the inhomogeneity problem also exists between catalyst particles, i.e. intra- and inter-particle inhomogeneity problems occur. This is significant as the morphology of the support or carrier material has an essential effect on the catalyst and, due to the replica effect, also on the polymer morphology. Thus, any variations in catalyst distribution and morphology lead to differences in catalytic behavior in polymerisation and result in inconsistencies in the polymer product. In addition, use of an external support involves additional costs, the quality of the support must be carefully controlled, leaching of the catalyst components from the support can occur and still sometimes carrier residues might cause some problems.

A catalyst providing the advantages of both homogenous and heterogeneous catalysts is clearly desirable. Whilst it was generally believed that it is very difficult to obtain good polymer particle morphology using an olefin catalyst, which is not supported on an external support, it was previously found that polymers having a good particle morphology may be obtained using such a catalyst, which is in the form of solid particles (but in which an external carrier or support is absent). For example, WO 03/051934 and WO2006/069733, the contents of which are incorporated herein by reference, describe such catalysts and processes comprising an emulsion/solidification technology for producing them. The preparation of this kind of catalysts is based on a liquid/liquid emulsion system comprising at least two phases, from which the catalyst particles forming the dispersed phase of the emulsion are solidified.

Furthermore pre-polymerisation has been used widely in the past in order to attempt to control the powder morphology of the resulting polymer product.

Unfortunately, prepolymerisation conditions have to be optimized for each single catalyst extra to ensure desirable polymer morphology. In addition, prepolymerisation is expensive on a commercial scale due in part to the need for additional reactor hardware, solvents, and monomer.

Further methods known in the art to obtain polymer product having uniform, compact spherical particles include: pre-activating or pre-contacting the metallocene and aluminoxane (EP 0 302 424, EP 0 354 893), utilizing finely divided alumoxane to yield a powdery polymer (e.g. EP 0 279 586) and utilizing a supported catalyst system and fillers in the catalyst system with affinities for polyolefins (e.g. EP 0 314 797). Nevertheless, these techniques suffer due to either unacceptable levels of reactor fouling which occur during polymerisation, low catalyst activity or producing a polymer with poor morphology.

Accordingly much development work has been done to improve the morphology properties of homogeneous and heterogeneous catalysts. However, due to the complexity of the catalyst systems there is a continuous need for alternative or improved methods of preparing unsupported, solid metallocene catalysts by using the emulsion/solidification technology, which allow an improved control of the catalyst morphology and yield catalysts with improved productivity.

It has been surprisingly found by the inventors of the present invention that catalyst particles having excellent morphology and improved productivity can be obtained by the emulsion/solidification technology if an aluminoxane co-catalyst and a compound, which can dissociate or partially dissociate into cationic and anionic species (M-X species), is used to form a solution which is then subsequently reacted with a metallocene complex to form the catalyst species.

The produced catalyst particles according to the invention have excellent morphology and yield polymerisation catalysts having improved activity and productivity. According to the replica effect, the polymer particles produced by using the inventive catalyst have very good morphological properties, too. The inventive catalyst preparation is based on a liquid/liquid two-phase system where no separate external carrier materials such as silica or $MgCl_2$ are needed in order to get solid catalyst particles.

Thus in a first aspect, the present invention is therefore directed to a process for the preparation of an unsupported, heterogeneous metallocene olefin polymerisation catalyst, comprising an organometallic compound of a transition metal of Group 3 to 10 of the Periodic Table (IUPAC 2007) or of an actinide or lanthanide in the form of solid particles comprising the steps of a) preparing a solution of an aluminoxane and an ionic complex M-X, M being an alkali or alkaline earth metal and X being a halide or pseudo halide, in a molar ratio of Al of the aluminoxane to M of the ionic complex between 80:1 and 300:1, b) mixing said solution with an organometallic compound of a transition metal of Group 3 to 10 of the Periodic Table (IUPAC 2007) or of an actinide or lanthanide in a molar ratio of M of the ionic complex to the transition metal of the organometallic compound between 1:1 and 4:1, yielding a second solution, c) dispersing said second solution obtained in step b) in a solvent immiscible therewith to form an emulsion in which said second solution of step b) forms the dispersed phase in the form of droplets and the solvent immiscible with said solution forms the continuous phase, d) solidifying said dispersed phase to convert said droplets to solid particles and optionally recovering said particles to obtain said catalyst.

Viewed from another aspect the invention provides a catalyst obtainable by, e.g. obtained by, a process as hereinbefore described.

Viewed from yet another aspect the invention provides the use of a catalyst as hereinbefore described in olefin polymerisation.

Viewed from still further aspect the invention provides a process for the preparation of polyolefins comprising polymerising at least one olefin in the presence of an olefin polymerisation catalyst as hereinbefore described.

In the first step of the process according to the invention a solution of an aluminoxane and an ionic complex M-X is formed.

The aluminoxane employed in step a) can be any conventional aluminoxane as is known in the art.

Aluminoxanes are commercially available or can be prepared according to prior art literature for example by the hydrolysis of aluminium alkyls either by direct water addition or by treatment with salt hydrates. There are a variety of methods for preparing aluminoxane and modified aluminoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and WO 94/10180, all of which are herein fully incorporated by reference.

Aluminoxanes are also called alumoxanes.

Preferably, $C_1$-$C_{10}$-alkylalumoxanes, particularly methylalumoxane or modified methylalumoxane, isobutylalumoxane, e.g. TIBAO (tetraisobutylalumoxane) or HIBAO (hexaisobutylalumoxane) are used for step a). More preferably methylalumoxane (MAO) is used.

Most preferably MAO commercially available as 5 to 30 wt % solution in an aromatic solvent, typically toluene is used.

The second compound used in step a) is an ionic complex M-X.

Ionic complexes M-X are compounds which can potentially dissociate or partially dissociate into cationic ($M^+$) and anionic components ($X^-$).

M is an alkali or alkaline earth metal, like Na, K, Li, Mg or Ca.

X is a halide, like F, Cl or Br, or a pseudohalide.

The term pseudohalide refers to moieties which are not halides but are generally considered to be a good leaving group in substitution reaction. Pseudohalides can include, for example, azides, cyanide, cyanate, thiocyanate, isocyanate, isothiocyanate, silicon groups, sulfur groups, nitrogen groups, oxygen groups, boron groups and phosphorous groups.

Non-limiting examples are alkali and alkaline earth halides or pseudo-halides such as LiCl, KCl, KF, NaF, $CaCl_2$, $MgCl_2$, $MgF_2$, $KOSiR_3$ or $NaBO_4$.

The molar ratio of aluminium, provided by the aluminoxane, and M (cationic moiety), provided by the M-X compound is in the range of 80:1 to 300:1, preferably from 100:1 to 250:1 and more preferably from 120:1 to 200:1

Preferably a solvent, more preferably an organic solvent is used to form the solution of step a). Still more preferably the organic solvent is selected from the group consisting of linear or cyclic alkanes, linear or cyclic alkenes, aromatic hydrocarbons and halogen-containing hydrocarbons.

Examples of aromatic hydrocarbons are toluene, benzene, xylene, ethylbenzene, cumene mesitylene or cymene. The preferred solvent used is toluene.

The solution in step a) may comprise one or more solvents. A mixture of solvents may be used in step a), provided that said mixture dissolves the aluminoxane and the M-X ionic complex mixed in step a) and the organometallic compound added in step b) and is immiscible, as defined below, with the continuous phase at least during the emulsion forming step c).

The solution of step a) is formed at a temperature between 10 and 35° C., preferably between 15 and 30° C. and more preferably between 20 and 25° C.

The solution obtained in step a) is then further mixed with an organometallic compound of a transition metal of Group 3 to 10 of the Periodic Table (IUPAC 2007) or of an actinide or lanthanide (step b).

The term "an organometallic compound of a transition metal" in accordance with the present invention includes any metallocene or non-metallocene compound of a transition metal which bears at least one organic (coordination) ligand and exhibits the catalytic activity alone and/or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC, Periodic Table of the Elements, 2007), as well as lanthanides or actinides.

Accordingly, said organotransition metal compound may have the following formula I:

$$(L)_m R_n TA_q \quad (I)$$

wherein T is a transition metal as defined above and each A is independently a monovalent anionic ligand, such as a sigma-ligand, each L is independently an organic ligand which coordinates to T, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadienyl or a mono-, bi- or multifused derivative of a cyclopentadienyl which optionally bears further substituents and/or one or more hetero ring atoms from a Group 13 to 16 of the Periodic Table (IUPAC); or (b) an acyclic. $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic sigma-, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "sigma-ligand" is meant a group bonded to the metal at one or more places via a sigma bond.

According to a preferred embodiment said organotransition metal compound (I) is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula II:

$$(CP)_m R_n TA_q \quad (II)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"3, —OSiR", —SR", —PR"2 or —NR"2, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"2, the two substituents R" can form a ring, e.g. five- or six-membered ring, together with the nitrogen atom wherein they are attached to.

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —$SiR^1_2$, wherein each $R^1$ is independently $C_1$-$C_{20}$-alkyl, $C_6$-$C_{20}$-aryl or tri($C_1$-$C_{20}$-alkyl)silyl-residue, such as a trimethylsilyl-residue.

T is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"3, —SiR"3, —OSiR"3 or —NR"2; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"2, the two substituents R" can form a ring, e.g. five- or six-membered ring, together with the nitrogen atom wherein they are attached to.

Each of the above mentioned ring moieties alone or as a part of a moiety as the substituent for Cp, A, R" or $R^1$ can further be substituted e.g. with $C_1$-$C_{20}$-alkyl which may contain Si and/or O atoms;

n is 0, 1 or 2, e.g. 0 or 1,
m is 1, 2 or 3, e.g. 1 or 2,
q is 1, 2 or 3, e.g. 2 or 3, wherein m+q is equal to the valency of T.

Said metallocenes of the formula (II) and their preparation are well known in the art.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula (II), each Cp independently bears one or more substituents selected from $C_1$-$C_{20}$-alkyl, $C_6$-$C_{20}$-aryl, $C_7$-$C_{20}$-arylalkyl (wherein the aryl ring alone or as a part of a further moiety may further be substituted as indicated above), —OSiR"3, wherein R" is as indicated above, preferably $C_1$-$C_{20}$-alkyl; X is H, halogen, $C_1$-$C_{20}$-alkyl, $C_1$-$C_{20}$-alkoxy, $C_6$-$C_{20}$-aryl, $C_7$-$C_{20}$-arylalkenyl or —NR"2 as defined above, e.g. —N($C_1$-$C_{20}$-alkyl)2; R is a methylene, ethylene or a silyl bridge, whereby the silyl can be substituted as defined above, e.g. a dimethylsilyl=, methylphenylsilyl= or trimethylsilylmethylsilyl=bridge; n is 0 or 1; m is 2 and q is two.

Preferably, R" is other than hydrogen.

A specific subgroup includes the well known metallocenes of Zr, Hf and Ti with one or two, e.g. two, η-ligands which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. siloxy, alkyl and/or aryl as defined above, e.g. at 2-, 3-, 4- and/or 7-positions. As specific examples e.g. bis(alkylcyclopentadienyl) Zr (or Ti or Hf) dihalogenides can be mentioned, such as bis(n-butylcyclopentadienyl)ZrCl2 and bis(n-butylcyclopentadienyl)HfCl2, see e.g. EP-A-129 368. Examples of compounds wherein the metal atom bears a —NR"2-ligand, are disclosed i.a. in WO-A-98/56831 and WO-A-00/34341. The contents of the above documents are incorporated herein by reference. Further metallocenes are described e.g. in EPA-260 130. Further examples of usable metallocenes may also be found e.g. from WO-A-97/28170, WO-A-98/46616, WO-A-98/49208, WO-A-99/12981, WO-A-99/19335, WO-A-98/56831, WO-A-00/34341, EP-A-423 101 and EP-A-537 130 as well as V. C. Gibson and S. K. Spitzmesser, in Chem. Rev. 2003; 103(1); pp 283-316, and of V. C. Gibson at al., in Angew. Chem. Int. Ed., engl., Vol 38, 1999, pp 428-447 the disclosures of which are incorporated herein by reference.

Alternatively, in a further subgroup of the metallocene compounds, the metal bears a Cp group as defined above and additionally a $\eta^1$ or $\eta^2$ ligand, wherein said ligands may or may not be bridged to each other. This subgroup includes so called "scorpionate compounds" (with constrained geometry) in which the metal is complexed by a $\eta^5$ ligand bridged to a $\eta^1$ or $\eta^2$ ligand, preferably $\eta^1$ (for example a sigma-bonded) ligand, e.g. a metal complex of a Cp group as defined above, e.g. a cyclopentadienyl group, which bears, via a bridge member, an acyclic or cyclic group containing at least one heteroatom, e.g. —NR"2 as defined above. Such compounds are described e.g. in WO-A-96/13529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the organotransition metal compounds of formula (I) usable in the present invention is known as non-metallocenes wherein the transition metal (preferably a Group 4 to 6 transition metal, suitably Ti, Zr or Hf) has a coordination ligand other than cyclopentadienyl ligand.

The term "non-metallocene'" herein means compounds, which bear no cyclopentadienyl ligands or fused derivatives thereof, but one or more non-cyclopentadienyl η- or σ-, mono-, bi- or multidentate ligand. Such ligands can be chosen e.g. from (a) acyclic, $\eta^1$- to $\eta^4$- or $\eta^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01/70395, WO 97/10248 and WO 99/41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99/10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02/060963). As examples of such compounds, i.e. transition metal complexes with nitrogen-based, cyclic or acyclic aliphatic or aromatic ligands, e.g. such as those described in the applicants earlier application WO-A-99/10353 or in the Review of V. C. Gibson at al., in Angew. Chem. Int. Ed., engl., Vol 38, 1999, pp 428-447 and V. C. Gibson and S. K. Spitzmesser, in Chem. Rev. 2003; 103(1); pp 283-316; or with oxygen-based ligands, such as Group 4 metal complexes bearing bidentate cyclic or acyclic aliphatic or aromatic alkoxide ligands, e.g. optionally substituted, bridged bisphenolic ligands (see i.e. the above review of Gibson et al.). Further specific examples of non-$\eta^5$ ligands are amides, amide-diphosphane, amidinato, aminopyridinate, benzamidinate, azacycloalkenyl, such as 0, allyl, beta-diketimate and aryloxide. The disclosures of the above documents are incorporated herein by reference. It should be noted that the diversity does not affect the applicability of the process of the invention.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (η-ligand) with a transition metal. Alternatively, a metal ion of an existing metallocene can be exchanged for another metal ion through transmetallation.

If several different transition metal compounds are used (mixed dual or multicatalyst systems), these can be any combinations of the above organometal compounds or of the above organometal compounds with other catalyst compounds (including Ziegler-Natta and chromium oxide systems), e.g. a combination at least of two or more a metallocenes, of a metallocene and a non-metallocene, as well as of a metallocene and/or a non-metallocene with a Ziegler-Natta catalyst system (which comprises typically a transition metal compound and a compound of a metal from Group 2 of the Periodic Table, such as a Mg compound).

The molar ratio of aluminium, provided by the aluminoxane, and the transition metal T is in the range of 1:1 to 10 000:1, preferably from 5:1 to 8 000:1, more preferably from 10:1 to 7 000:1, e.g. 100:1 to 4 000:1.

Typically in case of solid (heterogeneous) catalysts the ratio is from 10:1 to 1000:1, such as 100:1 to 500:1.

The quantity of aluminoxane cocatalyst to be employed in the catalyst of the invention is thus variable and depends on the conditions and the particular transition metal compound chosen in a manner well known to a person skilled in the art.

The molar ratio of M provided by the M-X compound and the transition metal T is in the range of 1:1 to 4:1, preferably 1.5:1 to 3:1 and more preferably 1.8:1 to 2.5:1

Step b) is performed at a temperature between 10 and 35° C., preferably between 15 and 30° C. and more preferably between 20 and 25° C.

In step c) the aluminoxane/M-X/organotransition metal compound containing solution, obtained in step b) (i.e. the second solution) is then dispersed in a solvent immiscible therewith to form an emulsion. In this emulsion said second solution of step b) forms the dispersed phase in the form of droplets and the solvent immiscible with said solution forms the continuous phase.

The principles for preparing two phase emulsion systems are known in the chemical field. Thus, in order to form the two phase liquid system, the solution obtained according to step b) and the solvent used as the continuous liquid phase have to be essentially immiscible at least during the dispersing step c). This can be achieved in a known manner, as described for example in WO 03/051934 or WO 2006/069733, e.g. by choosing said two liquids and/or the temperature of the dispersing step/solidifying step accordingly.

The immiscible solvent forming the continuous phase is an inert solvent and includes halogenated organic solvents, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoroalkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

As a reference to the surfactants and surfactant precursor WO 03/051934 or WO 2006/069733 is referred to.

The dispersing step c) can be effected as described, for example, in WO 03/051934 or WO 2006/069733, e.g. by mixing or by the so called phase change method.

Regardless of the method used to form the emulsion, its temperature prior to step d) is −20 to +50° C., preferably −10 to +40° C., more preferably −5 to 30° C. and most preferably 0 to 20° C.

The solidification step d) can also be effected as described, for example, in WO 03/051934 or WO 2006/069733.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The solid particles formed can be isolated by conventional separation methods.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m$^2$/g, still more preferably less than 20 m$^2$/g, yet more preferably less than 15 m$^2$/g, yet still more preferably less than 10 m$^2$/g and most preferably less than 5 m$^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934 or WO 2006/069733.

The reaction steps c) and d) may be carried out batch wise or at least one of steps (c) to (d) of the above catalyst preparation process is carried out in a continuous, rather than in a batch wise manner.

Details, embodiments and examples for the semi-continuous or continuous process for steps c) and d) are described for example in WO 2006/069733, the contents of which are incorporated herein by reference.

With the above described preparation method unsupported, solid polymerisation catalysts having excellent morphology and high activity and productivity are obtained.

Therefore the present invention is also related to an unsupported, solid polymerisation catalyst having excellent morphology and high activity and productivity, obtainable by a process as described above.

Furthermore this advantageous catalyst needs no pre-polymerisation step in order to achieve the desired properties of excellent morphology and high activity and productivity.

The present invention is further related to the use of the above defined polymerisation catalyst for olefin polymerisation to yield polyolefins and the polyolefins produced with such a catalyst.

Suitable polyolefins comprise polyethylene and polypropylene homopolymers and also polyethylene, polypropylene and polypropylene/ethylene copolymers comprising from 0 to 40 wt % $C_3$ to $C_{30}$-alpha-olefin or $C_4$ to $C_{30}$-diene-derived units, and more particularly a copolymer or terpolymer of ethylene and/or propylene with 0 to 10 wt % alkenes, for example 1-propene, 1-butene, 1-pentene, 4-methyl-pent-1-ene, 1-hexene, cyclohexene, 1-octene and norbornene, or dienes, for example butadiene, hexadiene or octadiene.

In a preferred embodiment the polyolefins produced by using the catalyst according to the invention are ethylene polymers, which contain as comonomers 0 to 40 wt % $C_3$ to $C_{30}$-alpha-olefins, preferably $C_3$ to $C_{10}$-alpha-olefins, more preferably $C_3$ to $C_6$-alpha-olefins, and most preferably butene or hexene, or mixtures thereof.

The polyolefin composition further can show unimodal, bimodal or multimodal molecular weight distribution. Bimodal or multimodal polyolefins can be produced in dual or multi-stage and -reactor processes which are known in the art and for example are described by F. P. Alt et al. in MACROMOL. SYMP., 135-143 (2001) and METALLOCENE-BASED POLYOLEFINS 366-378 (2000); and U.S. Pat. No. 6,407,185, U.S. Pat. No. 4,975,485, U.S. Pat. No. 4,511,704 or in single reactors with the use of a plurality of catalysts.

Any method of olefin polymerisation—for example, a gas phase, slurry phase, solution polymerisation process or any combinations thereof—that is known for the polymerisation of olefins to form polyolefins in combination with the catalysts of the invention can be used.

Polymerisation can be a one stage or a two or multistage polymerisation process, carried out in at least one polymerisation reactor. Multimodal polymers with respect to the molecular weight distribution (MWD) are produced in a multistage process, where low molecular weight and higher molecular weight polymers are produced in different polymerisation steps, in any order. Different combinations for producing multimodal polymers can be used, e.g. gas-gas phase, slurry-slurry phase, slurry-gas phase processes; slurry-gas phase polymerisation being a preferred one. Unimodal polymers can be produced in a one stage polymerisation, although more than one stage is possible, but then polymers with approximately the same molecular weight are produced in each stage. Any type of polymerisations as listed above are possible, however, slurry process being one preferred process.

In addition to the actual polymerisation the process configuration can comprise any pre- or post reactors.

The catalyst according to the invention may be introduced into the polymerisation reactor by any suitable means regardless of the type of polymerisation reactor used. In one embodiment, the catalyst is fed to the reactor in a substantially dry state, meaning that the isolated solid form of the catalyst has not been diluted or combined with a diluent prior to entering the reactor. In another embodiment, the catalyst is combined with a diluent and fed to the reactor; the diluent in one embodiment is an alkane, such as a $C_4$ to $C_{20}$-alkane, toluene, xylene, mineral or silicon oil, or combinations thereof, such as described in, for example, U.S. Pat. No. 5,290,745.

Generally the quantity of catalyst used will depend upon the nature of the catalyst, the reactor types and conditions and the properties desired for the polymer product. Conventional catalyst quantities, such as described in the publications referred herein, may be used.

The reactor setup is not particularly limited and can be any reactor setup known to the skilled person. Suitable types of reactors and means for operating the reactors are for example described in U.S. Pat. Nos. 4,003,712, 4,588,790, 4,302,566, 5,834,571, 5,352,749, 5,352,749 and 5,462,999, which are all fully incorporated herein by reference.

For slurry reactors, e.g. loop reactors, the reaction temperature will generally be in the range of 50 to 110° C. (e.g. 60-100, or 70 to 110° C.), the reactor pressure will generally be in the range of 20 to 80 bar (e.g. 30-70 bar), and the residence time will generally be in the range of 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions.

For gas phase reactors, the reaction temperature used will generally be in the range of 50 to 130° C. (e.g. 60 to 115° C., or 60 to 100° C.), the reactor pressure will generally be in the range of 5 to 60 bar, preferably 10 to 40 bar and the residence time will generally be 1 to 8 hours. The gas used will commonly be a non-reactive gas such as nitrogen together with monomer.

Hydrogen may be introduced into a reactor to control the molecular weight of the polymer as is well-known and routine in the art. In one embodiment, the mole ratio of hydrogen to total olefin monomer in the circulating gas stream is in a range of from 0.001 or 0.002 or 0.003 to 0.014 or 0.016 or 0.018 or 0.024, wherein a desirable range may comprise any combination of any upper mole ratio limit with any lower mole ratio limit described herein. Expressed another way, the amount of hydrogen in the reactor at any time may range from 1000 ppm to 20,000 ppm in one embodiment, and from 2000 to 10,000 in another embodiment, and from 3000 to 8,000 in yet another embodiment, and from 4000 to 7000 in yet another embodiment, wherein a desirable range may comprise any upper hydrogen limit with any lower hydrogen limit described herein.

The invention therefore also provides a process for producing a polymer composition comprising at least (i) an alpha-olefin homo- or copolymer component as defined above, wherein alpha-olefin monomers, optionally together with one or more comonomers, are polymerized in the presence of the special catalyst according to the invention.

In case the polymer composition consists of component (i) the process is a single stage process.

The invention further provides a process for producing a polymer composition comprising at least two different alpha-olefin homo- or copolymer components (i) and (ii) as defined above or in claims below, wherein each component is produced by polymerising alpha-olefin monomers, optionally together with one or more comonomers, in the presence of the polymerisation catalyst according to the invention in a multistage polymerisation process using one or more polymerisation reactors, which may be the same or different, e.g. at least loop-loop, gas-gas or any combination of loop and gas. Each stage may be effected in parallel or sequentially using same or different polymerisation method. In case of a sequential stages each components, e.g. (i) and (ii), may be produced in any order by carrying out the polymerisation in each step, except the first step, in the presence of the polymer component formed, and preferably the catalyst used, in the preceding step. Alternatively, the same or different catalyst can be added in the subsequent step(s).

In one embodiment the process for producing any of the above polymer composition comprising (i) an alpha-olefin homopolymer or copolymer component and, optionally, (ii) an alpha-olefin homopolymer or copolymer component includes the steps of:

(a) polymerising in a slurry reactor zone, preferably a loop reactor, alpha-olefin monomers, optionally together with one of more comonomers, in the presence of the catalyst according to the invention to produce polymer component (i), and (b) optionally transferring the reaction product of step (a) to a subsequent gas phase reactor zone and polymerising alpha-olefin monomers, optionally together with one or more comonomers, in the presence of the reaction product of step (a) to produce polymer component (ii) for obtaining the polymer composition, and (c) recovering the obtained composition.

A preferred multistage process is a "loop-gas phase"-process, such as developed by Borealis NS, Denmark (known as BORSTAR® technology) described e.g. in patent literature, such as in EP 0887 379, in WO92/12182 or in WO 2005/002744.

The polymer compositions produced according to the invention can be used for a great variety of applications, like for example for blown films, pipe, extrusion coating, wire and cable jacketing, injection moulding, blow moulding or rotomoulding Methods:

Molecular Weights, Molecular Weight Distribution (Mn, Mw, MWD)-GPC

The weight average molecular weight Mw and the molecular weight distribution (MWD=Mw/Mn wherein Mn is the number average molecular weight and Mw is the weight average molecular weight) was measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The bulk density of the polymer powder was determined according to ASTM D 1895-96, method A.

Comonomer content was determined in a known manner based on Fourier transform infrared spectroscopy (FTIR) determination using Nicolet Magna 550 IR spectrometer together with Nicolet Omnic FTIR software calibrated with $^{13}$C-NMR Al, K and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental IRIS Advantage XUV Inductively Coupled Plasma-Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 50 ppm K, 20 ppm Zr in a solution of 5% $HNO_3$, 3% HF in DI water) and a quality control sample (20 ppm Al, 20 ppm K 10 ppm Zr in a solution of 5% $HNO_3$, 3% HF in DI water). The content of zirconium was monitored using the 339.198 nm line, the content of aluminium via the 396.152 nm line and the potassium using the 766.490 nm line. The reported values, required to be between 0 and 100, or further dilution is required, are an average of three successive aliquots taken from the same sample and are related back to the original catalyst using equation 1.

$$C = \frac{R \times V}{M} \quad \text{Equation 1}$$

Where:

C is the concentration in ppm, related to % content by a factor of 10,000

R is the reported value from the ICP-AES

V is the total volume of dilution in ml

M is the original mass of sample in g

If dilution was required then this also needs to be taken into account by multiplication of C by the dilution factor.

The catalyst productivity is defined as the amount of polymer in kilograms obtained per gram solid catalytic component used (e.g. kg PE/g catalyst). (polymerisation conditions: 60 min at 80° C.)

EXAMPLE 1

Complex Preparation 10 ml of 30 wt % methylalumoxane in toluene (MAO, 13.78 wt % Al, supplied by Albemarle) were admixed with 26 mg of KCl and stirred at room temperature for 18 hours to form a solution.

A 5 ml aliquot of the above solution was subsequently contacted with 33 mg of [(1,2,4-Me$_3$Cp)$_2$ZrCl$_2$] (supplied by Boulder Scientific Company) to yield the activated complex solution with a molar ratio of Al/K=150 and Al/Zr=300.

Emulsion Formation 50 ml of dried perfluoro-1,3-dimethylcyclohexane (PFC) (94%, F2 Chemicals Ltd) were placed in a 100 ml emulsion reactor. The contents was subsequently bubbled with nitrogen for 15 minutes, and cooled to 0° C. for 20 min. An emulsion was then generated by adding the above mentioned activated complex solution and a 3-perfluorooctyl-1,2-propeneoxide (PFPO, 96%, Sigma-Aldrich) surfactant-solution (0.2 ml of a stock solution made from 1 ml surfactant (PFPO and 4 ml of PFC) and stirring with 554 rpm for 15 min.

Solidification

Approximately 75% of the above emulsion was siphoned into a separate vessel containing 150 ml of stirred (435 rpm) and heated PFC (98° C.) using a Teflon tube. The temperature of the contents decreased between 76° C. to 80° C. while adding the emulsion. A precipitate formed immediately.

Isolation

The mixture was allowed to cool to 32° C. under stirring for 35 min. PFC was siphoned out and the remaining yellow catalyst was dried in argon flow at 50° C. for two hours.

COMPARATIVE EXAMPLE CE1 AND CE2

As comparative example CE1 a catalyst was prepared according to Example 1, but adding KCl in such an amount (390 mg) that a molar ratio of Al:K of 30:1 was obtained.

As comparative Example CE2 a catalyst was prepared according to Example 1, but without addition of KCl.

ICP elemental analysis of the catalyst samples can be seen in Table 1

TABLE 1

| ICP analysis (wt %) | CE2 | CE1 | Example 1 |
|---|---|---|---|
| Al | 37.8 | 36.8 | 37.9 |
| Zr | 0.27 | 0.39 | 0.41 |
| K | 0 | 0.53 | 0.11 |

EXAMPLE 2

Ethylene-Co-1-Hexene Polymerisation Procedure

Polymerisations were carried out in a Büchi 5 L stainless steel autoclave reactor equipped with a paddle stirrer and a continuous supply of ethylene. Ethylene (>99.95%), nitrogen (>99.999%) and isobutane (>97%), 1-hexene (>99%) were further treated with sets of purifiers removing selectively O$_2$, H$_2$O, CO, CO$_2$ and acetylene.

An appropriate amount of the catalysts prepared according to Example 1, CE1 and CE2 was charged to a feeding vessel in glove box after which the feeding vessel is transferred to the reactor. The autoclave was purged with nitrogen and charged with propane (1.1 kg), ethylene (150 g) and 1-hexene (55 ml) at room temperature. The reactor temperature was then raised to 60° C. at which point the catalyst was injected under N$_2$ over pressure. The reactor temperature was immediately reset to 80° C. (time from 60-80° C. ca. 5-8 min) and ethylene was fed on demand to maintain 38 bar total pressure in the reactor. The polymerisation experiment was terminated 60 min after the 80° C. set point was reached, via rapid venting the reactor contents. The polymer sample was then collected and allowed to dry in a well vented fume-hood overnight.

Further parameters of the polymerisation process and of the polyethylene copolymer samples can be seen from Table 2:

TABLE 2

| Catalyst polymerisation | CE2 | CE1 | Example 1 |
|---|---|---|---|
| Catalyst amount (mg) | 83.8 | 55.8 | 76.8 |
| Polymer yield (g) | 291 | 63.7 | 391 |
| Productivity (kgPol/g cat) | 3.5 | 1.14 | 5.1 |
| Bulk density (kg/m$^3$) | 500 | n.m. | 440 |
| Hexene content by FTIR (wt %) | 2.4 | n.m. | 1.9 |
| Mn (g/mol) | 60000 | n.m. | 170000 |
| Mw (g/mol) | 333000 | n.m. | 412000 |
| MWD (None) | 5.6 | n.m. | 2.4 |
| Mz (g/mol) | 755000 | n.m. | 547000 | n.m. not measured

The catalyst according to the invention (Example 1) yields a polyethylene copolymer with clearly narrower MWD than the catalyst prepared without addition of KCl (CE2) as can be seen from Table 2. This narrowing in MWD is a clear indication of the single-site nature of the inventive catalyst.

Figure 1:
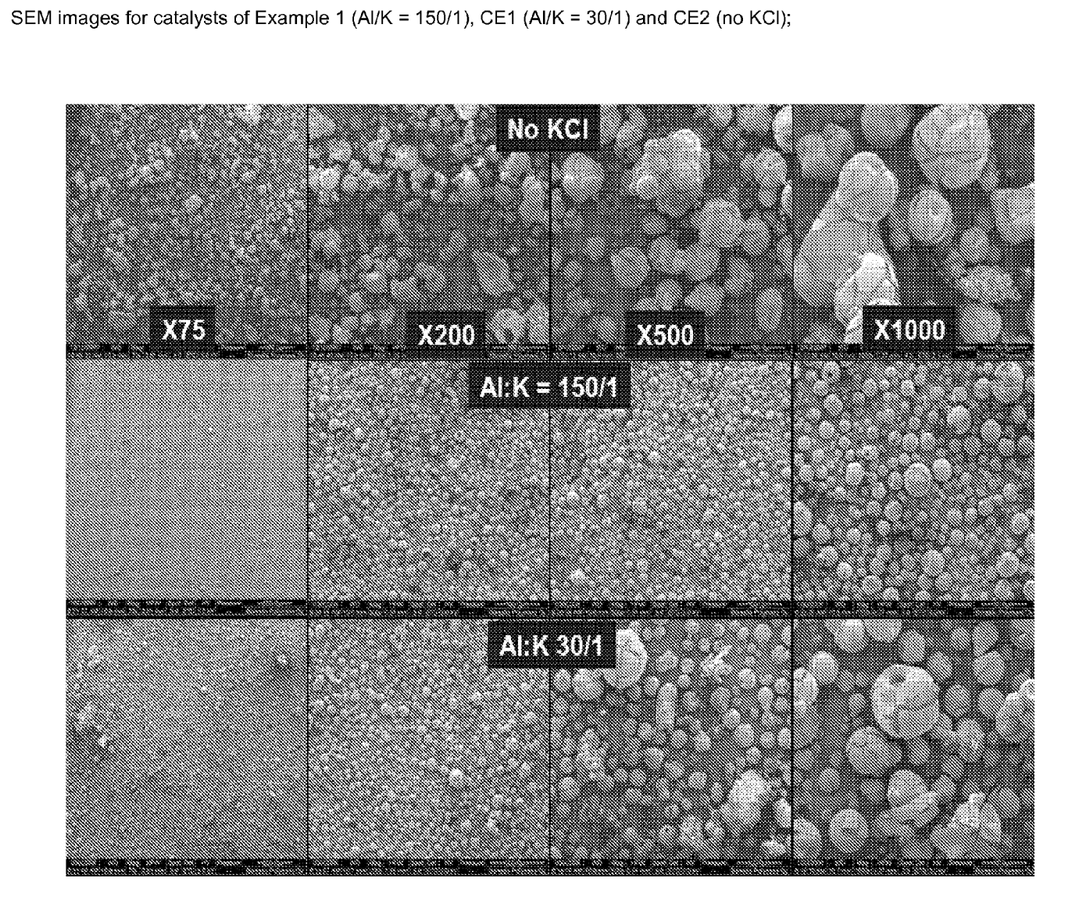

In FIG. 1 scanning electron microscopy (SEM) images of the catalysts according to Example 1 and Comparative Examples CE1 and CE2 are shown. These images clearly illustrate the tremendous improvement in catalyst morphology for the catalyst according to the invention (Example 1)

We claim:

1. Process for the preparation of an unsupported, heterogeneous olefin polymerisation catalyst, comprising an organometallic compound of a transition metal of Group 3 to 10 of the Periodic Table (IUPAC 2007) or of an actinide or lanthanide in the form of solid particles comprising the steps of
   a) preparing a solution of an aluminoxane and an ionic complex M-X, M being an alkali or earth alkali metal and X being a halide or pseudo halide, in a molar ratio of Al of the aluminoxane to M of the ionic complex between 80:1 and 300:1,
   b) mixing said solution with an organometallic compound of a transition metal of Group 3 to 10 of the Periodic Table (IUPAC 2007) or of an actinide or lanthanide in a molar ratio of M of the ionic complex to the transition metal of the organometallic compound between 1:1 and 4:1, yielding a second solution c) dispersing said second solution obtained in step b) in a solvent immiscible therewith to form an emulsion in which said second solution of step b) forms the dispersed phase in the form of droplets and the solvent immiscible with said solution forms the continuous phase, d) solidifying said dispersed phase to convert said droplets to solid particles and optionally recovering aid particles to obtain said catalyst.

2. A process according to claim 1 wherein said aluminoxane in step a) is methylaluminoxane.

3. A process according to claim 1 wherein the ionic complex M-X in step a) is selected from the group consisting of KCl, KF, NaF, LiCl, CaCl$_2$, MgCl$_2$, MgF$_2$, KOSiR$_3$ and NaBO$_4$.

4. A process according to claim 1 wherein the organometallic compound of a transition metal is a compound of formula (I)

$$(L)_m R_n TA_q \quad (I)$$

wherein T is a transition metal as defined in claim 1 and each A is independently a sigma-ligand, each L is independently an organic ligand which coordinates to T, R is a bridging group linking two ligands L, m is 1, 2 or 3, n is 0, 1 or 2, q is 1, 2 or 3, and m+q is equal to the valency of the metal.

5. An improve process according to claim 4 wherein the organometallic compound of a transition metal is a metallocene compound of formula (II)

$$(Cp)_m R_n TA_q \quad (II)$$

wherein
each Cp independently is an unsubstituted or substituted and/or fused homo- or heterocyclopentadienyl ligand; the optional one or more substituent(s) being selected from the group consisting of halogen, C$_1$-C$_{20}$-alkyl, C$_2$-C$_{20}$-alkenyl, C$_2$-C$_{20}$-alkynyl, C$_3$-C$_{12}$-cycloalkyl, C$_6$-C$_{20}$-aryl or C$_7$-C$_{20}$-arylalkyl, C$_3$-C$_{12}$-cycloalkyl which contains 1, 2, 3 or 4 heteroatom(s) in the ring moiety, C$_6$-C$_{20}$-heteroaryl, C$_1$-C$_{20}$-haloalkyl, —SiR"$_3$, —OSiR", —SR", —PR"2 and —NR"2, each R" is independently a hydrogen or C$_1$-C$_{20}$-alkyl, C$_2$-C$_{20}$-alkenyl, C$_2$-C$_{20}$-alkynyl, C$_3$-C$_{12}$-cycloalkyl or C$_6$-C$_{20}$-aryl; or in case of —NR"2, the two substituents R" can form a ring together with the nitrogen atom wherein they are attached to, R is a bridge of 1-7 atoms and 0-4 heteroatoms, wherein the heteroatom(s) can be Si, Ge and/or O atom(s), whereby each of the bridge atoms may bear independently substituents selected from the group consisting of C$_1$-C$_{20}$-alkyl, tri(C$_1$-C$_{20}$-alkyl)silyl, tri(C$_1$-C$_{20}$-alkyl)siloxy and C$_6$-C$_{20}$-aryl substituents; or a bridge of 1-3 hetero atoms selected from the group consisting of silicon, germanium and oxygen atom(s), T is a transition metal selected from Ti, Zr or Hf, each A is independently H, halogen, C$_1$-C$_{20}$-alkyl, C$_1$-C$_{20}$-alkoxy, C$_2$-C$_{20}$-alkenyl, C$_2$-C$_{20}$-alkynyl, C$_3$-C$_{12}$-cycloalkyl, C$_6$-C$_{20}$-aryl, C$_6$-C$_{20}$-aryloxy, C$_7$-C$_{20}$-arylalkyl, C$_7$-C$_{20}$-arylalkenyl, —SR", —PR"$_3$, —SiR"$_3$, —OSiR"$_3$ or —NR"$_2$; each R" is independently hydrogen or C$_1$-C$_{20}$-alkyl, C$_2$-C$_{20}$-alkenyl, C$_2$-C$_{20}$-alkynyl, C$_3$-C$_{12}$-cycloalkyl or C$_6$-C$_{20}$-aryl; or in case of —NR"$_2$, the two substituents R" can form a ring together with the nitrogen atom wherein they are attached to, n is 0 or 1, m is 1 or 2, q is 2 or 3, wherein m+q is equal to the valency of T.

6. A process according to any preceding claim 1 wherein an aromatic solvent is used in step a) to form the solution, the solvent being selected from the group consisting of toluene, benzene, xylenes, ethylbenzene, cumene mesitylene and cymene.

7. A process according to claim 6 wherein the aromatic solvent used in step a) is toluene.

8. A process according to any of preceding claim 1 wherein in step a) a molar ratio of aluminium, provided by the aluminoxane employed, and M, provided by the M-X compound employed, is in the range of 100:1 to 250:1.

9. A process according to claim 1 wherein in step b) a molar ratio of aluminium, provided by the aluminoxane employed, and the transition metal, provided by the organometallic compound employed, is in the range of 100:1 to 500:1.

10. A process according to claim 1 wherein in step c) said immiscible solvent which forms the continuous phase comprises a fluorinated hydrocarbon, a functionalized derivative thereof or mixtures thereof.

11. A process according to claim 1 wherein in step c) an emulsifying agent is present during the formation of said emulsion.

12. A process according to claim 1 wherein in step d) the solidification is effected by a temperature change treatment.

* * * * *

UNITED STATES PATENT AND TRADEMARK OFFICE
CERTIFICATE OF CORRECTION

PATENT NO. : 8,394,733 B2
APPLICATION NO. : 12/998628
DATED : March 12, 2013
INVENTOR(S) : Severn et al.

It is certified that error appears in the above-identified patent and that said Letters Patent is hereby corrected as shown below:

In the Specification

Column 2, Line 16, "catalysts" should be --catalyst--.

Column 7, Line 28, delete "at" should be --et al.--.

Column 7, Line 37, insert --triazabicycloalkenyl-- after "such as" and delete "0".

Column 7, Line 58, delete "a" after "or more" and before "metallocenes".

Column 8, Line 10, insert --Step a) a molar ratio of aluminum, provided by the aluminoxane employed, and M, provided by the M-X compound employed, is in the range of 100:1 to 250:1--.

Signed and Sealed this
Fifteenth Day of October, 2013

Teresa Stanek Rea
*Deputy Director of the United States Patent and Trademark Office*